April 26, 1938.  J. H. NOYES ET AL  2,115,467
RECORD SHEET HOLDER
Filed July 22, 1936  3 Sheets-Sheet 1
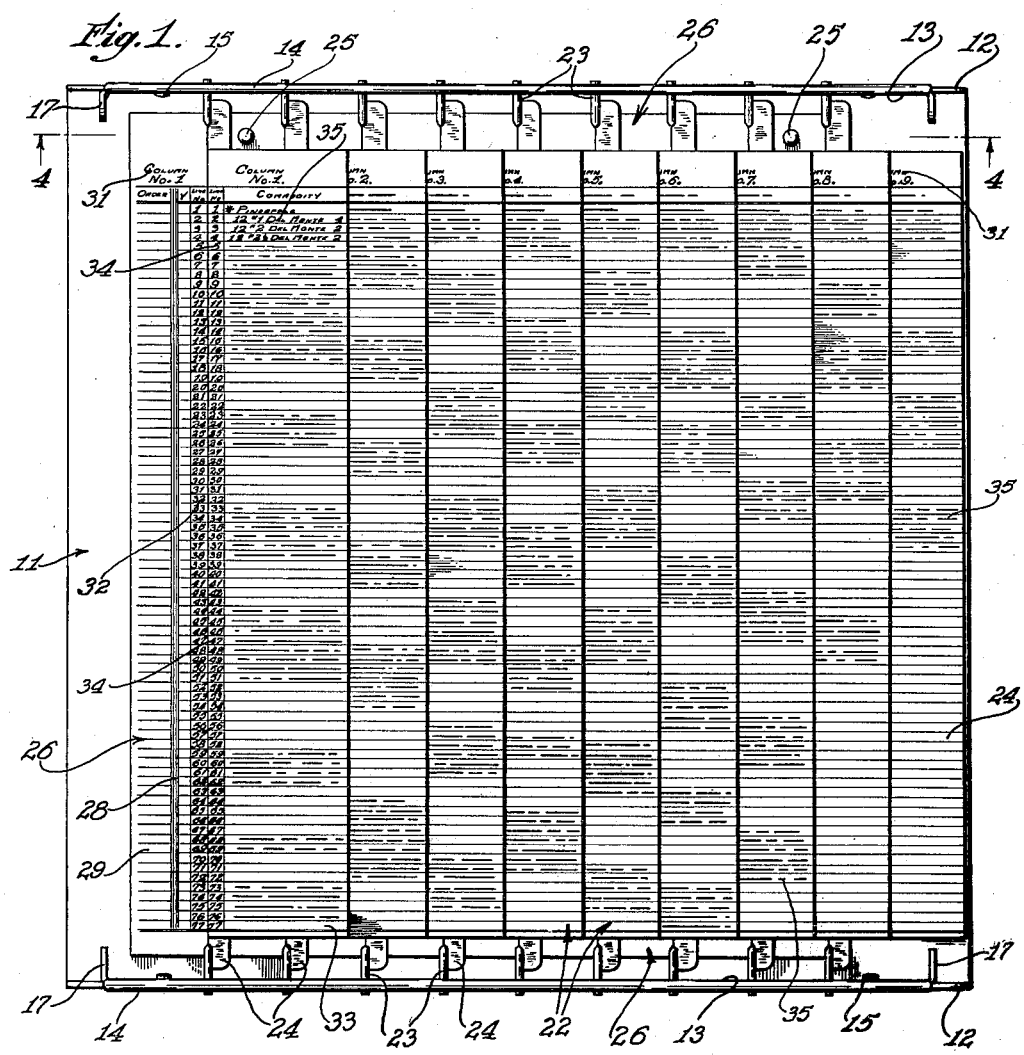
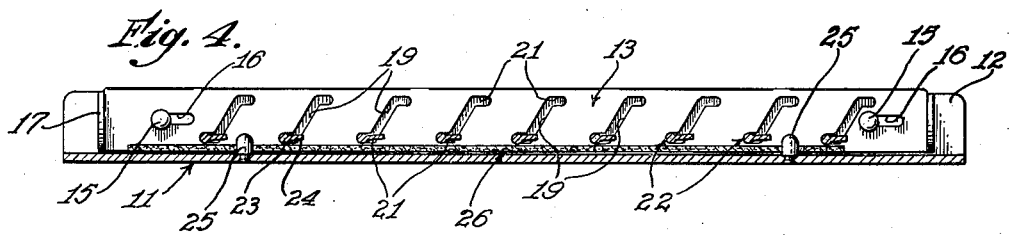
INVENTORS.
John H. Noyes
and
Charles B. Moore
BY
Rasmussen & Brugman
ATTORNEYS.

April 26, 1938.  J. H. NOYES ET AL  2,115,467
RECORD SHEET HOLDER
Filed July 22, 1936  3 Sheets-Sheet 2
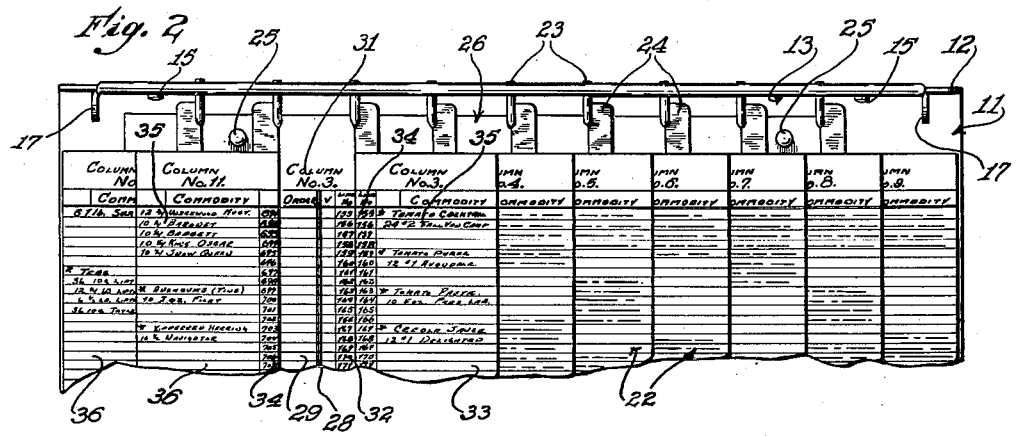
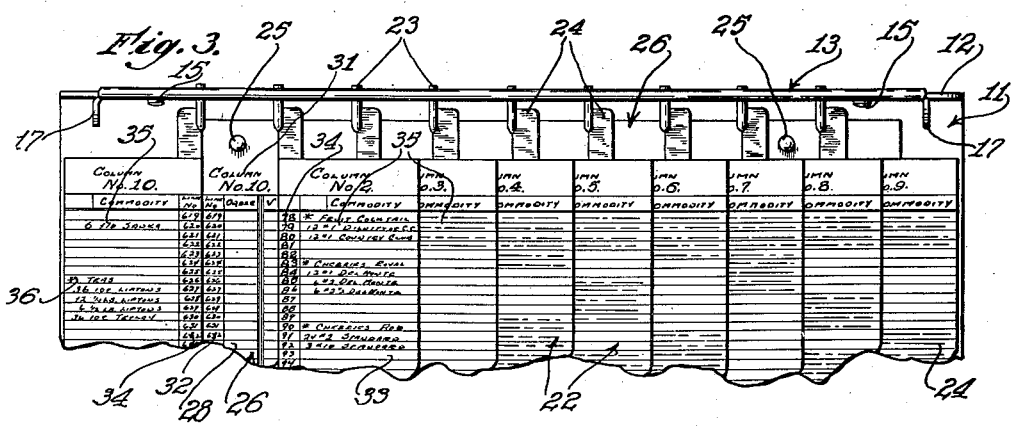
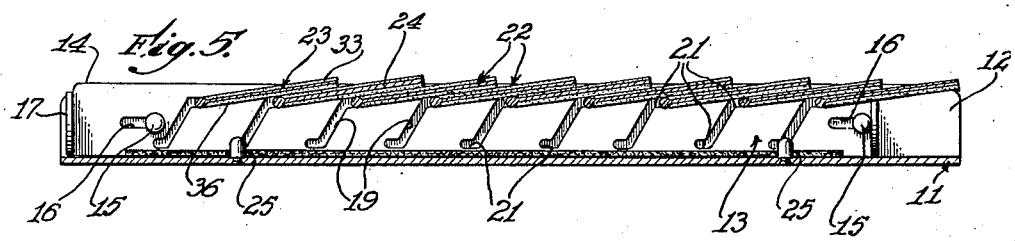
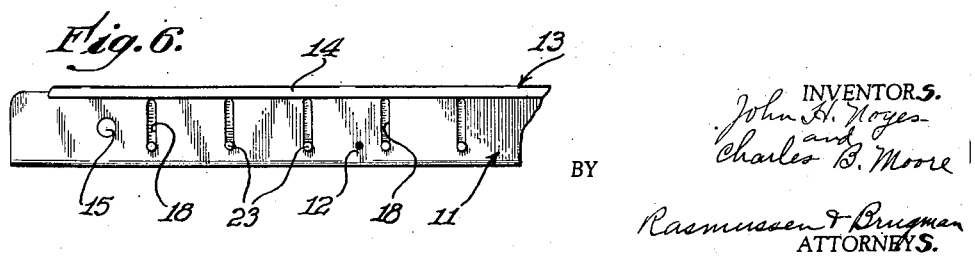
INVENTORS.
John H. Noyes
and
Charles B. Moore
BY
Rasmussen & Brugman
ATTORNEYS.

April 26, 1938.  J. H. NOYES ET AL  2,115,467
RECORD SHEET HOLDER
Filed July 22, 1936   3 Sheets-Sheet 3
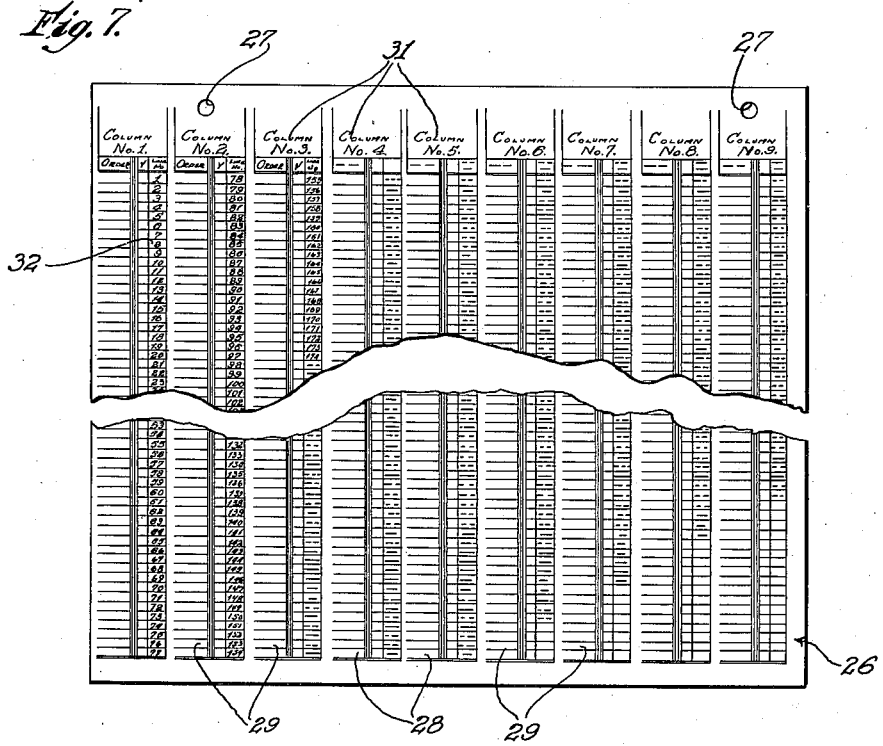
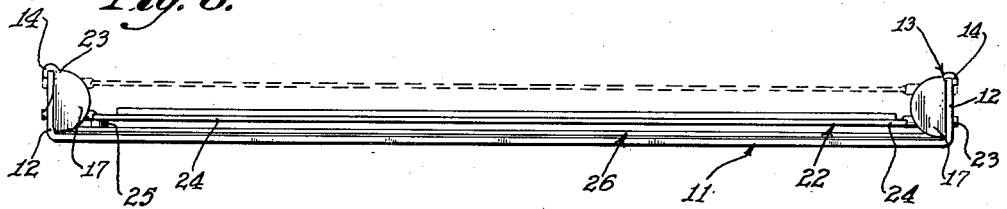
INVENTORS.
John H. Noyes
Charles B. Moore
BY
Rasmussen & Brugman
ATTORNEYS.

Patented Apr. 26, 1938

2,115,467

UNITED STATES PATENT OFFICE 2,115,467

RECORD SHEET HOLDER

John H. Noyes, Chicago, Ill., and Charles B. Moore, Cincinnati, Ohio, assignors to Felt and Tarrant Mfg. Co., Chicago, Ill., a corporation of Illinois Application July 22, 1936, Serial No. 91,857

9 Claims. (Cl. 281—44)

This invention relates in general to record sheet holders, and more particularly to a record sheet holder that greatly facilitates the tabulation of a large number of items on a single sheet by carrying the names of commodities or other notations relative to such items in such manner as to bring the same adjacent to certain related blank spaces on the record sheet, when the latter is properly positioned in the holder, to eliminate the necessity of having such notations inscribed upon the record sheet.

A principal object of the invention is the provision in such a record sheet holder of a base member having means for positioning a record sheet thereon in desired relationship to other means mounted for movement relative to the base member, the latter means carrying notations which will be thus alined with certain spaces on the record sheet, so that data relative to such notations may be inscribed upon the sheet in the right spaces, and data already so inscribed on a record sheet will be correlated with the proper notations to facilitate the accurate interpretation of such data.

Another important object of the invention is the provision of such a record sheet holder in which the notation carrying means is adapted to maintain the record sheet on the sheet positioning means.

A further object of the invention is the provision of such notation carrying means which are reversible relative to the base member to display other notations on their opposite sides in such position as to co-operate with related spaces on another record sheet having the spaces marked off in different arrangement from those on the first record sheet so as to increase the capacity of the device.

Numerous other objects and advantages of the invention will be apparent as it is better understood from the following description, which, when taken in connection with the accompanying drawings, discloses a preferred embodiment thereof.

In the drawings:

Figure 1 is a top plan view of a preferred embodiment of the invention;

Fig. 2 is a partial top plan view of the device similar to Fig. 1 showing the notation carrying means in another position;

Fig. 3 is a partial top plan view of the device similar to Figs. 1 and 2 with a different style of record sheet;

Fig. 4 is a sectional view taken substantially on the line 4—4 of Fig. 1;

Fig. 5 is a sectional view of the device showing the notation carrying means in raised position;

Fig. 6 is an end view of a part of the device;

Fig. 7 is a top plan view of one form of record sheet that may be used in the device; and Fig. 8 is a side elevational view of the device.

Referring more particularly to the drawings, reference numeral 11 indicates in general a base member or backing support which is preferably rectangular in shape and formed of sheet metal, or any other suitable material. The upper and lower edges of the backing support 11 are bent upwardly to provide substantially vertically disposed marginal flange portions 12. A strip or slide 13 is slidably mounted on each of the flanges 12, and is preferably retained thereon by means of an upper flange 14 formed integrally therewith and bent down over the upper edge of the flange 12. A bolt or pin 15 is rigidly secured in any suitable manner to each of the flanges 12 adjacent each end thereof and extends inwardly through a suitable elongated slot 16 in the slide members 13. The pins 15 may be provided with suitable head portions of a larger diameter than the width of the slots 16, so that the slide members 13 are only permitted limited longitudinal movement relative to the flanges 12. Each end of the slides 13 may be bent inwardly to provide a suitable flange or finger piece 17 to facilitate longitudinal movement of the slides.

Each of the flanges 12 is provided with a plurality of vertically disposed, longitudinally spaced, elongated slots 18. Similarly spaced elongated slots 19 are provided in each of the slides 13, the slots 19 being disposed at a slight angle to the vertical. The slots 19 terminate at both their lower and upper ends in short horizontal recesses or dwells 21.

A plurality of notation carrying devices or strips, indicated generally by reference numeral 22, are provided, each of which comprises a short shaft or turning axis 23 secured to each end of a thin rectangular strip 24, which may be made of sheet metal or any other suitable material. The strips 24 are sufficiently flexible to permit bending thereof to allow the insertion of the pins or shaft portions 23 into the related slots 18 and 19 in the flanges 12 and slides 13, respectively. The spacing of the slots 18, 19 and the width of the strips 24 are such as to result in the latter being mounted in vertically disposed, shingled or overlapping relationship, as shown in Figs. 1 to 3, and 5. From these figures, it will also be apparent that the strips 24 may each be swung to either of two substantially horizontal positions, using the pins 23 as turning axes.

Referring to Figs. 4, 5, and 6, it will be seen that longitudinal movement of the slides 13 relative to the flanges 12, as permitted by the pin and slot connections 15, 16 therebetween, will result in vertical movement of the members 22 relative to the backing support 11. The members 22 will be maintained in either their upper or lower positions against accidental displacement by means of the pins 23 resting in the horizontal recesses or dwells 21 of the slots 19. Fig. 4 shows the members 22 in their normal or lowermost position, while Fig. 5 shows them in their upper or raised position.

The base member or backing support 11 is provided with a pair of short, upstanding pins 25 secured thereto in any suitable manner adjacent the upper slide 13. These pins 25 are adapted to properly position a suitable record sheet, indicated generally by reference numeral 26, on the backing support 11 by engaging holes or apertures 27 provided in the record sheet adjacent the upper marginal edge thereof. With the members 22 in their raised position of Fig. 5, a record sheet 26 may be slid endwise under the same and be positioned over the pins 25. Lowering of the members 22 to their position of Fig. 4 by sliding the members 13 to the right (as seen in Figs. 4 and 5) will bring them into their normal position, in which their pivotal edges are disposed below the plane of the tops of the pins 25. It will thus be apparent that in their normal position the members 22 function as a retaining means to maintain the record sheet 26 on the backing support 11 in its working position, as determined by the location of the pins 25 and apertures 27.

The preferred form of record sheet 26 shown in the drawings is provided with a plurality of vertically disposed columns 28, each of which is divided into a plurality of blank spaces 29 by means of suitable horizontal and vertical lines inscribed thereon. Each column 28 may be identified by suitable indicia 31 adjacent its upper end, and the various horizontally disposed spaces inscribed thereon may be likewise identified by suitable numerals or the like 32.

Each of the members 22 is adapted to function as a support for a replaceable strip of paper or the like 33, which is divided into a plurality of horizontal spaces and vertical columns having indicia 34 inscribed therein similar to indicia 32 on the record sheet 26, and identifying notations 35 inscribed thereon adjacent to the related indicia 34. Similar strips 36 may be removably secured to the reverse sides of the strips 24 on which the positions of the indicia 34 and notations 35 are reversed, so that the former are inscribed adjacent the turning axis or pivot edge of the members 22, as is the case of the indicia 32 on the strips 33.

The operation of the device will be described in conjunction with the tabulation of orders for merchandise in a retail establishment and the filling of these orders at a warehouse or wholesale establishment, but it is to be understood that this is merely exemplary and that the instant device is capable of numerous other uses.

A blank order sheet 26 is positioned in the record sheet holder as above described by raising the notation carrying members 22 to their position of Fig. 5, impaling the record sheet on the pins 25, and lowering the members 22 to their position of Fig. 4, in which they will retain the record sheet in set position. Each article of merchandise is represented by one of the indicia 34 on the strips 33 and is specifically identified by the corresponding notation 35. With the members 22 in their position of Fig. 1, only the left hand column 28 on the record sheet 26 will be exposed. It will be noted that the item numbers or indicia 32 on the record sheet 26 are in horizontal alinement with the corresponding item numbers 34 and identifying notations 35 on the strips 33. Desiring to order any quantity of a particular item that is to be found on the left hand strip 33, the retail merchant will inscribe such quantity in the blank space 29 of the left hand column 28 of the record sheet 26 opposite that particular item. Having finished with the items inscribed on the first left hand strip 33, the operator may swing the notation carrying member 22 supporting this strip through substantially 180 degrees to its position of Fig. 2. In this figure, the first and second left hand notation carrying members 22 are shown in such reversed position. Such movement of the members 22 to their reversed position will expose the column 28 on the record sheet 26 corresponding to the strip 33 adjacent thereto on the right side thereof. In this manner, any and all columns 28 on the record sheet 26 may be exposed to view, either in sequence or in any desired order.

Having filled out the order blank or record sheet 26, the operator may remove the same from the device and send it to the warehouse or wholesale dealer. Here it may be inserted, as above described, in a similar record sheet holder having the same notations on the members 22. In filling out the order, the particular items desired and the quantity thereof may be accurately and readily determined by moving the members 22 so as to expose the desired column 28 on the record sheet and its associated strip 33.

By mounting the strips 36 on the reverse sides of the members 22, the capacity of the device is doubled, since a different record sheet may be employed with these strips which is similar to the record sheet 26, but has the columns 28 thereon spaced longitudinally in a different manner relative to the apertures 27, and has the indicia 32 on the opposite side of the columns 28 to bring them adjacent the indicia 34 on the strips 36, as shown in Fig. 3. Since each of the strips 33 and 36 is provided with suitable identifying marks 31 corresponding with their associated columns 28 on the two different types of record sheets 26, there can be no possibility of error either in making out or filling the order.

The advantages of the instant device are readily apparent. Its use obviates the necessity of printing the identifying notations 35 on the record sheets so that a greater number of items may be entered on each sheet. Hence an appreciably smaller number of record sheets need be employed. In addition, the instant record sheet holder provides a backing support which may be readily carried around to greatly facilitate the making out and filling of the orders.

It will be readily apparent that the strips 33 and 36 may be mounted on or supported by the members 22 in a different manner than that shown in the drawings. For example, the strips 24 may be bent over the pivot pins 23 to provide a U-shaped clamping device within which the strips 33 and 36 may be inserted. Such a clamping device may also be formed from strips of cellophane, or other transparent material.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A record sheet holder, comprising a base member, means associated with said base member for positioning a record sheet thereon, and a plurality of strip members mounted on said base member in overlapping relationship for carrying indicia and identifying notations relating to columnar spaces on said record sheet, said means and said strip members co-operating to position related spaces, indicia and notations adjacent each other, and said strip members being mounted for movement relative to said base member to expose only a desired column of spaces on said record sheet.

2. A record sheet holder, comprising a base member, means associated with said base member for positioning a record sheet thereon, and a plurality of separate notation carrying strip members mounted on pivots supported on said base member for movement relative to said base member and to each other to expose a desired portion of said record sheet, said pivots being mounted for translational movement toward and away from said base member.

3. A record sheet holder, comprising a base member, means associated with said base member for positioning a record sheet thereon, and a plurality of notation carrying strip members mounted on said base member in overlapping relationship to each other for selected movement to expose a desired portion of said record sheet and either surface of a selected one of said strip members.

4. A record sheet holder, comprising a base member, means associated with said base member for positioning a record sheet thereon, and a plurality of notation carrying strip members removably mounted in overlapping relationship to each other on said base member and adapted to be reversibly positioned relative thereto.

5. A record sheet holder, comprising a base member, means associated with said base member for positioning a record sheet thereon, and a plurality of separate notation carrying strip members pivotally mounted on said base member on spaced parallel axes so as to be selectively moved to expose a desired portion of said record sheet.

6. A record sheet holder, comprising a base member, means associated with said base member for positioning a record sheet thereon, and a plurality of notation carrying strip members pivotally mounted on said base member in overlapping relationship to each other.

7. A record sheet holder, comprising a base member, means associated with said base member for positioning a record sheet thereon, a plurality of notation carrying strip members, and strip members supporting means mounted on said base member for movement relative to said base member to move said strip members vertically into and out of operative relationship with said record sheet.

8. In a record sheet holder, a base member, a plurality of pins secured to and upstanding from said base member for locating a record sheet thereon, a pair of marginal flanges secured to and upstanding from said base member, a slide mounted for limited longitudinal movement on each of said flanges and a plurality of notation carrying strip members having shaft portions extending through substantially vertical slots provided in said flanges and slots in said slides disposed angularly thereto, whereby movement of said slides relative to said flanges will move said strip members vertically relative to said base member.

9. In a record sheet holder, a base member, means mounted on said base member for locating a record sheet thereon having columns of blank spaces and identifying indicia, and a plurality of members pivotally mounted on said base member in overlapping relationship to each other for supporting replaceable sheets having columns of similar indicia and identifying notations thereon, said first means and said sheet supporting members co-operating to position related indicia on said sheets adjacent each other.

JOHN H. NOYES.
CHARLES B. MOORE.